Jan. 8, 1924.
G. H. SAUTON
1,480,472
GAS METER PROTECTING MEANS
Filed Aug. 18, 1922     2 Sheets-Sheet 1
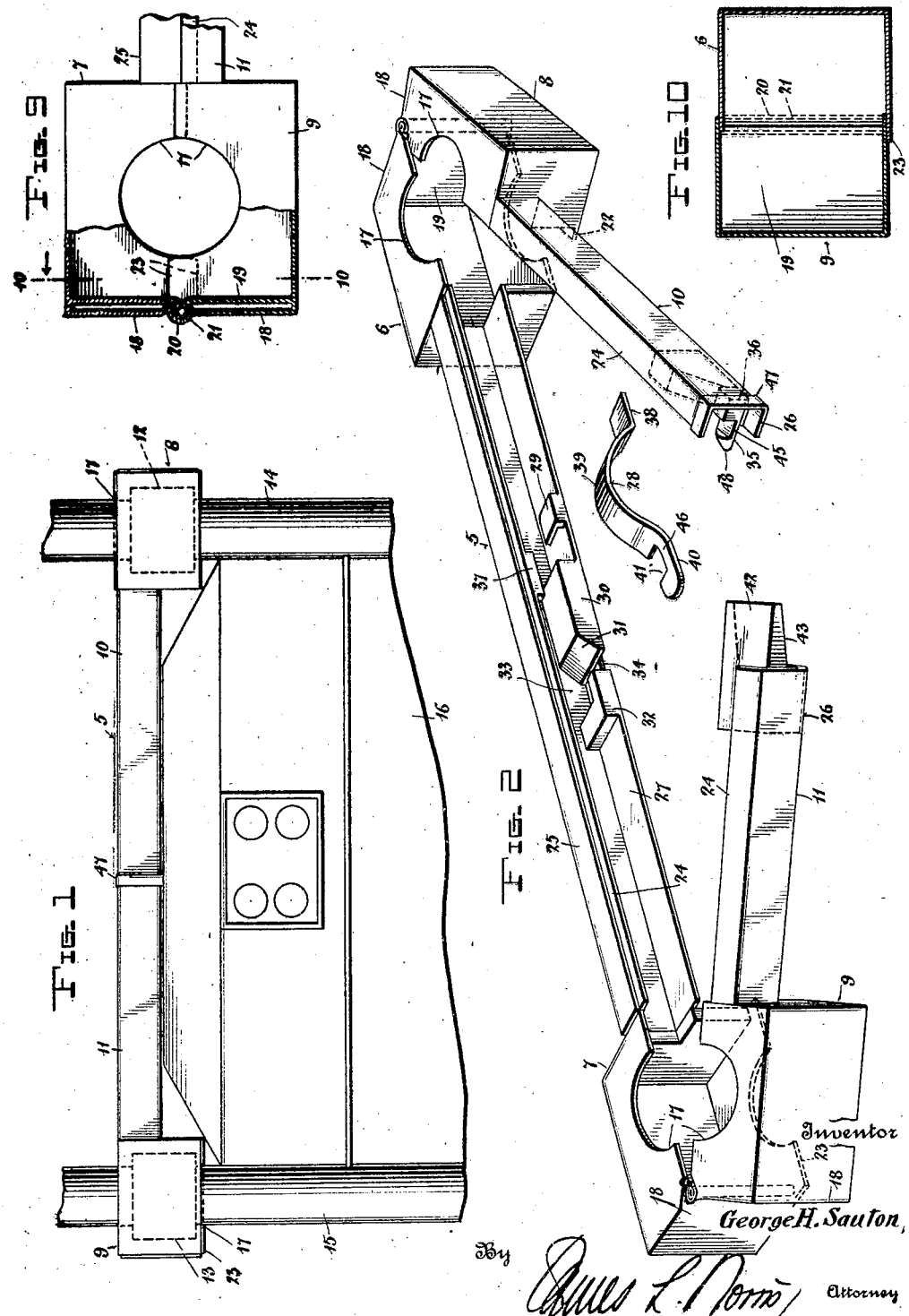

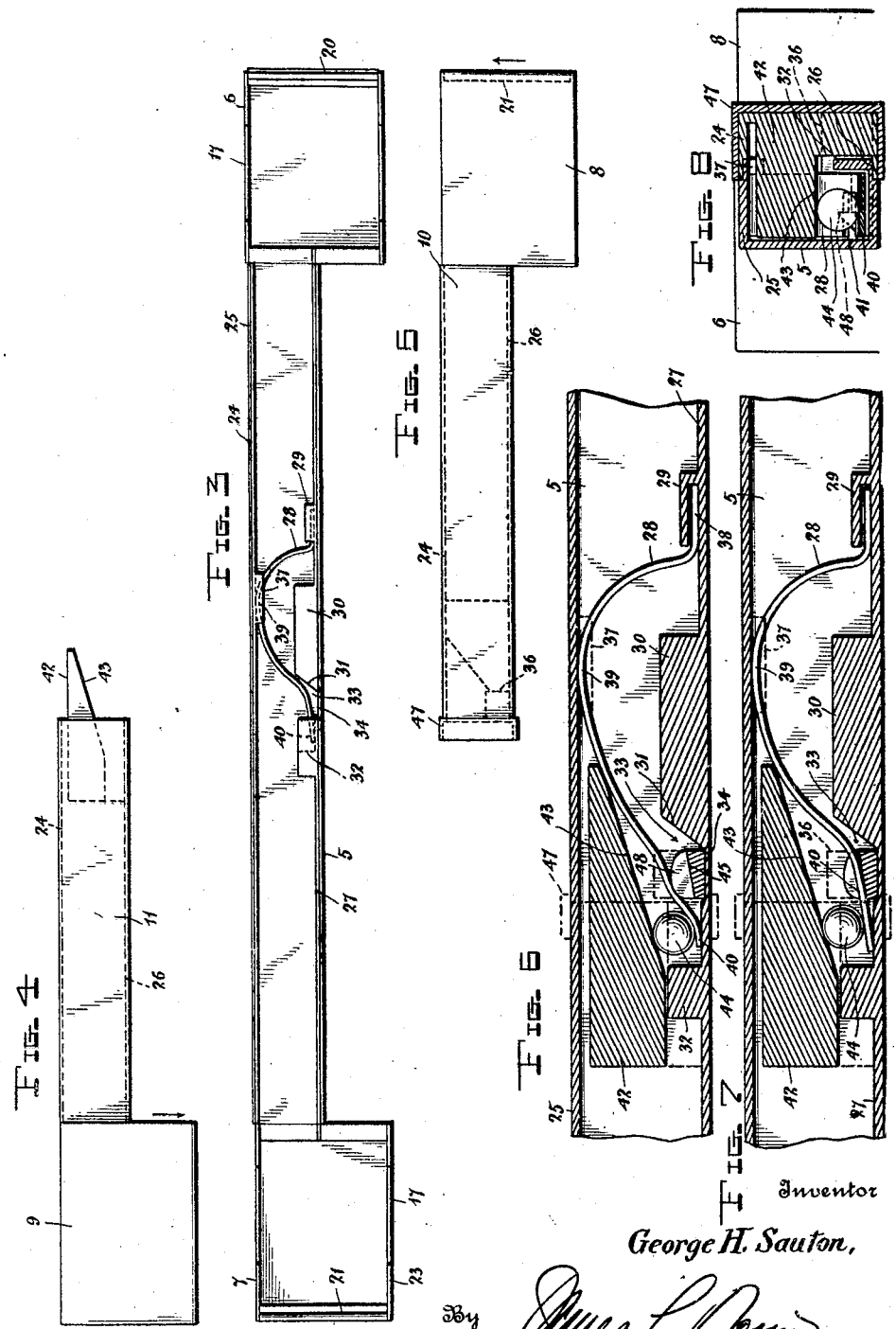

Patented Jan. 8, 1924.

1,480,472

UNITED STATES PATENT OFFICE.

GEORGE H. SAUTON, OF NEW ORLEANS, LOUISIANA, ASSIGNOR OF ONE-SIXTEENTH TO EDWARD H. WALSDORF AND ONE-SIXTEENTH TO LOUIS HUFFT, BOTH OF NEW ORLEANS, LOUISIANA.

GAS-METER-PROTECTING MEANS.

Application filed August 18, 1922. Serial No. 582,669.

*To all whom it may concern:*

Be it known that I, GEORGE H. SAUTON, a citizen of the United States, residing at New Orleans, in the parish of Orleans and State of Louisiana, have invented certain new and useful Improvements in Gas-Meter-Protecting Means, of which the following is a specification.

This invention relates to gas meter protecting means, and the primary object of the invention is to provide improved devices for completely enclosing and locking the coupling unions or nuts of the communicating pipes of a gas meter or similar registering device to prevent any possibility of tampering with the coupling unions or nuts by unauthorized persons and obstruct nefarious interference with the regular flow of gas through the meter and false registration of the amount of gas used. A further object of the invention is to lock the improved coupling union or nut enclosing devices by a connecting concealed locking organization which will resist all tampering efforts to release the same by preventing the introduction of wires or implements of any sort from the exterior of the organization for the purpose of reaching and releasing the locking components. A still further object of the invention is to lock the improved coupling union or nut enclosing devices by connecting means that require breakage to effect a release of said devices, and thereby defeat resetting or reapplying of the improved devices to normal positions and readily disclose irregular practices to divert the gas flow from a meter if an attempt is made to accomplish this purpose.

With these and other objects and advantages in view, the invention consists in the construction and arrangement of the several parts which will be more fully hereinafter described and claimed.

In the drawings:

Fig. 1 is an elevation of a part of a gas meter of ordinary form and the communicating pipes therefor, showing the improved protecting means applied thereto in locked condition;

Fig. 2 is a perspective view of the improved protecting means shown on an enlarged scale and illustrating the parts open and the spring element separated therefrom;

Figs. 3, 4 and 5 illustrate side elevations of the parts of the improved protecting means and relatively positioned to show the manner of associating the same;

Fig. 6 is a horizontal section on an enlarged scale through the locking mechanism for the connecting members of the improved protecting means and showing the parts of said mechanism prior to full locking positions thereof;

Fig. 7 is a view similar to Fig. 6, showing the parts of the locking mechanism in full locked positions;

Fig. 8 is a transverse vertical section through the improved locking mechanism as shown by Figs. 6 and 7;

Fig. 9 is a top plan view of one of the end enclosures or boxes partially broken away and showing the joint for the members thereof in horizontal section; and Fig. 10 is a section on the line 10—10, Fig. 9.

The improved protecting means comprises a continuous hull or tubular member 5 fixed at its opposite ends to enclosures or box members 6 and 7 of similar construction and to which are respectively hinged like enclosures or box members 8 and 9 having tubular connecting arms 10 and 11 projecting inwardly therefrom and adapted to overlap when closed against the connecting member 5 and form with the latter a complete tubular connecting or bridging means between the end closures or box members, which conjointly provide a tight housing over the coupling unions or joint nuts 12 and 13 of the pipes 14 and 15 having communication with the meter 16 in the usual manner. To adapt the application of the closure or box sections 6 and 8 over the couplings or joint nuts 12 and 13 of the pipes 14 and 15, the said closure or box sections are formed with semicircular openings 17 in the upper and lower sides thereof, which conjointly produce circular openings when the said sections are closed. Adjacent to the outer end 18 of the respective enclosures or box-like sections 6 and 7 and 8 and 9 a hinge plate 19 is secured in parallel relation to each of said ends and spaced a distance from the latter, the inner edges of these hinge plates being projected beyond the inner terminal edges of the ends 18 and rolled, as at 20 and 21, to form elongated hinge knuckles, the knuckles 21 of the sections 6 and 9 being smaller and adapted to snugly and movably slide into the larger knuckles 20 of the sections 7 and 8, these knuckles being in reverse positions on the respective closures or box like sections 6 and 7 and 8 and 9 to provide hinged joint connections which will permit the free opening and closing movements of the sections 8 and 9 and their connecting members 10 and 11 relatively to the connecting member 5, and to so position the said enclosure or box-like sections that they may partially overlap at the top and bottom portions thereof to effectively close the joints between the sections when the latter are shut and locked, as clearly shown by Fig. 10. The opposing sections 7 and 8 have projecting flanges 22 and 23 continuing from the bottom portions thereof, to effect the overlapping relation of the joints between these sections as just explained. It is proposed to construct all of the parts of the improved protecting and locking means of cast metal of suitable thickness, the inner opposing ends of the sections 6, 7, 8 and 9 being preferably thicker than the remaining parts, to give the sections sufficient rigidity for securement and support of the members 5, 10 and 11. The outer double end wall construction of the sections 6, 7, 8 and 9 and including the hinge plates 19 also produce a strong structure, in that the hinge devices, or the rolled edges or knuckles 20 and 21, are removed from the outer end plates 18, and furthermore, this double end wall construction will materially defeat any attempts to separate the sections 6 and 7 and 8 and 9 at the points of their hinged jointure. The tubular members 5, 10 and 11 also have an overlapped edge association when the members 10 and 11 are closed against the member 5, the top plates 23 of the members 10 and 11 engaging over a flange 24 extending outwardly from the underside of the top plate 25 of the member 5, and the bottom plates 26 of the members 10 and 11 fit over the edge portion of the bottom plate 27 of the member 5, and by this means a sealed joint is produced throughout the full length of the closed members 10, 11 and 5.

The purpose of making all of the joints of the cooperating parts above described of a sealed or overlapping nature is to prevent the introduction of wires or other devices through the joints for the purpose of tampering with the locking mechanism which will be presently explained. All of the parts of the end enclosing hollow boxes formed by the sections 6 and 7 and 8 and 9 and also the members 5, 10 and 11 will be comparatively light and economical in the cost of manufacture, but at the same time they will be strong and durable. It is proposed to make these parts uniformly of a resisting character relatively to considerable exteriorly applied force or pressure that may be brought to bear thereon in an attempt to irregularly separate or otherwise tamper with the several parts.

The improved locking means is divided up and partially carried by the members 5, 10 and 11, the main locking element consisting of a flat metal spring 28 held in the member 5 at the center of the latter. On one side of the center of the bottom plate 27 of the member 5 an angular keeper 29 is secured and projects over the inner side of said latter plate at a suitable distance from a metal combined space and guard block 30 of considerable thickness and of a width to extend fully over the inner side of the bottom plate 27 of the member 5, as clearly shown by Fig. 2. The one end 31 of this combined guard and space block 30 is beveled to form a clearance for the action of the spring 28 and to facilitate the insertion of a catch device which will be hereinafter explained. Adjacent to the beveled end 31 of the block 30 is an angular or L-shaped combined guard and space block 32 which is of less thickness than the block 30 but forms with the beveled end 31 of the latter a pocket or locking space 33, as clearly shown by Figs. 6 and 7. The edge of the bottom plate 27 of the member 5 between the beveled end 31 of the block 30 and the adjacent end of the block 32 is cut away to provide a clearance recess 34 for the movement in between the said block ends of a rigid support projecting catch 35 carried by the inner end of the member 10, the said catch 35 continuing from the inner reduced end of a guard and space block 36 secured in the said member 10, as shown by dotted lines in Fig. 2. The top plate of the member 5 has an inner downwardly projecting retention lug 37 for the spring and the latter has its one end 38 flattened and pushed under the keeper 29, the intermediate bowed portion 39 of the spring extending up to the inner side of the top plate inside of the lug 37, and the opposite end extending downwardly over the beveled end 31 of the combined space block and guard 30 and terminating adjacent to the inner edge of the block 32. The free end 40 of this spring is also straightened and normally stands at a slight incline to the intermediate bowed body portion 39 of the spring and has a slot 41 opening through the inner edge which is confined within the members 5, 10 and 11 and between the beveled end 31 of the block 30 and the adjacent end of the block 32. The inner free end of the member 11 has a wedge block 42 projecting therefrom, with a beveled side 43 adapted to close over and be located adjacent to the inner opposing ends of the blocks 30 and 32 and provide an inner inclined wall for the locking space 33 into which the free slotted end 40 of the spring 28 projects. The improved locking mechanism also includes a movable locking element in the form of a ball 44, which is jammed between the inclined wall 43 of the wedge-shaped projection 42 of the member 11 and the free end 40 of the spring 28, as clearly shown by Figs. 6 and 7. The effective locking engagement of the free end 40 of the spring 28 and the catch 35 carried by the member 10 is accomplished through the formation of a transverse slot 45 in the said catch which receives the reduced portion 46 of the free end 40 of the spring 28 and which is formed in view of the provision of the slot 41, this slot permitting the free extremity of the catch 35 to move freely therein or without obstruction when the reduced catching portion 46 of the spring 28 slips into the slot 45 of the catch.

In applying the improved gas meter protecting means to the meter communicating pipes 14 and 15, the members 10 and 11 are opened far enough relatively to the member 5 to permit the sections 6 and 7 to be fitted snugly against the pipes 14 and 15 over the coupling unions or joint nuts of the latter, and then the said members 10 and 11 are closed or moved inwardly towards the member 5, care being taken to seat the ball or movable locking element 44 between the end 31 of the block 30 and the adjacent end of the block 32 and against the free end 40 of the spring 28. In closing the members 10 and 11, the member 11 is first pushed inwardly slightly in advance of the member 10, so that the inner free end of the latter member may overlap the inner free end of the member 11, the said inner free end of the member 10 having a joint flange 47 to embrace the inner free end of the said member 11. When the member 11 is closed, the ball or movable locking element 44 engages the inclined side 43 of the wedge projection 40 and is slightly jammed against the free end 40 of the spring 28 and holds the said spring end in the position shown by Fig. 7. When the catch 35 moves inwardly with the member 10 into the locking space 33 between the beveled end 31 of the block 30 and the adjacent end of the block 32, the portion of the spring extending across the said locking space is pressed upwardly by the reduced end 48 of said catch, and this upward pressure of the spring continues until the reduced portion 46 of said spring engages the slot 45 of the catch, and at this instant the two members become firmly locked and will be so held by the wedging action instituted through the ball or movable locking member 44 by the wedge projection 42, and the entire protecting means with its overlapped edges will have all of the joints fully covered and protected and the locking means will be completely enclosed within the members 5, 10 and 11 and inaccessible from any point. The wedge projection 42 and the blocks 30, 32 and 36 carried by and positioned in the members 5, 10 and 11, as hereinbefore explained, shield and protect the vital portions of the lock, as it were, against boring operations and insertion of wire or other implements for the purpose of dislodging or dissociating the parts of the lock. Even though openings were bored through the sides or enclosing plates of the members 5, 10 and 11 adjacent to the block mechanism and a wire or other implement inserted, displacement of the locking elements and release of the catch 35 would be defeated, in view of the fact that the ball or movable locking element is held tightly in place against the free end 40 of the spring 28 and cannot be dislodged from such position either to the right or left longitudinally of the connecting members or elevated, in view of the position of the block 32, the catch 35 and the wedge projection or block 42, and as a consequence, the only possible way to separate the sections 6 and 7 and 8 and 9 to render the coupling unions or joint nuts of the pipes 14 and 15 accessible would be to break or entirely cut through or sever the connecting members 5, 10 and 11, and this latter procedure would obviously frustrate any subsequent attempt to re-apply the improved meter protecting means after nefarious manipulation of the coupling unions or joint nuts of the pipes 14 and 15 had been accomplished without detection.

From the foregoing it will be seen that the improved protecting means essentially includes enclosures for the coupling unions or joint nuts of the communicating pipes of a gas meter and communicating means between said enclosures provided with a concealed locking means which will resist all attempts to open the same from the exterior of the connecting members, and in fact the protecting means when once applied cannot be opened except by breaking or destroying the same.

Instead of making the parts of the improved protecting means of cast metal, it will be understood that other materials adapted for the purpose may be used and similarly formed, it being possible, for instance, to mold the parts from glass or analogous vitreous material, or a composition of materials may be used.

The reversely arranged hinged joint connections at the outer ends of the enclosing or box-like sections, in addition to the advantages hereinbefore specified, facilitate the application of the meter protecting means to the meter communicating pipes, and in the preferred manner of applying the improved protecting means, the member 5 with the sections 6 and 7 carried at opposite ends thereof will be first fitted to the meter pipes over the coupling unions or joint nuts and the sections 8 and 9 respectively connected to the said sections 6 and 7 and the members 10 and 11 then closed into the member 5, as hereinbefore specified. The enclosing or box-like sections at the ends of the members 5, 10 and 11 are shown as angular in contour and conjointly provide square enclosing means. It will be understood, however, that these enclosures or box-like sections may be changed in shape to conform to any particular contour of joint means applied to the communicating pipes for the meter, and furthermore, the proportions and dimensions of the several parts may be varied as desired and found necessary.

What is claimed as new is:

1. In a gas meter protecting means, the combination with the coupling joints of pipes communicating with a meter, of enclosing means completely covering each joint and having hollow members extending from one to the other of the said means, the hollow members being in part fixed to the enclosing means and in part movably associated with the latter and provided with interfitting extremities and movable to and from the fixed parts of the hollow members, and locking devices completely held and concealed within the said members and automatically secured when the movable members are closed to protect the locking devices against exterior manipulation.

2. A gas meter protecting means having terminal devices for fully enclosing pipe joints and provided with hollow connecting members in part rigidly attached to the devices and in part movable and provided with interfitting extremities which are normally separable, and locking means concealed within the hollow connecting members and in part carried by the movable members and automatically locking the movable members and the entire device against removal from the pipe joints when the movable members are closed and thereby permanently securing the protecting means and rendering the same releasable only by breaking and destroying the said members.

3. A gas meter protecting means comprising end enclosures for completely covering pipe joints and including a hollow member immovably secured thereto and also movable hollow sections extending between the end enclosures, and locking means wholly enclosed by the immovable member and sections and automatically locked by the closure of the sections to permanently secure the protecting means to the pipe joints and the protecting means thus given a non-openable application except by destruction of the parts of the said protecting means.

4. A gas meter protecting means having pipe joint enclosures comprising sections separably and movably attached to each other, a part of the sections having a hollow rigid connection extending from one to the other and the remaining portions of the sections having movable hollow members which extend across from one enclosure section to the other and have interfitting extremities and also inner joint edges to cooperate with the edges of the rigid connecting member, and locking means wholly mounted and concealed within the rigid and movable connecting members between the sections of the joint enclosures and having an automatic locking operation to permanently secure the members and sections against movement except by breaking and destroying the parts of the protecting means.

5. A gas meter protecting means, comprising terminal joint enclosing sections having a separable hinged association and provided with connecting members which are in part fixed to portions of the sections and in part normally movable with relation to the remaining portions of the sections, and locking means enclosed within the connecting members and operating to automatically and permanently lock the latter and the sections against movement when the protecting means is applied.

6. A gas meter protecting means comprising terminal joint enclosing sections reversely separable and connected by hinge joints, a part of the sections being connected by a member continuing from one to the other and the remaining sections having connecting members movable therewith and closable into the continuous member, and locking means interposed between and enclosed within the said members to permanently secure the latter and the sections.

7. A gas meter protecting means comprising hollow terminal enclosures for pipe joints, each enclosure having a similar structure and part of the enclosures rigidly connected by a continuous hollow cross member and the remaining part of the enclosures provided with hollow connecting means which are movable therewith, and locking means fully enclosed within the hollow cross member and the hollow connecting means movable with the enclosures and automatically secured by engaging the hollow movable connecting means with the hollow cross member, the locking means being exteriorly inaccessible and the protecting means openable only by breaking the parts thereof.

8. A gas meter protecting means comprising hollow terminal pipe joint enclosures connected by a continuous hollow member and also by sectional connecting members movable in relation to the said continuous hollow member, and automatically operating locking means enclosed in part within the said members and secured by closing the movable sectional connecting member inwardly against the said continuous member, thereby rendering the locking means exteriorly inaccessible, removal of the protecting means being possible only by breakage of the members connecting the pipe joint enclosures.

9. A gas meter protecting means, having hollow terminal pipe joint enclosures comprising movable sections, a part of the sections having a continuous connecting member between them and the remaining sections provided with shorter connecting sections movable into close engagement with the continuous member, and locking means having different portions thereof carried by the respective members and enclosed within the latter and serving to permanently lock the said members and sections against opening movement when the protecting means is applied.

10. A gas meter protecting means having terminal pipe joint enclosures composed of similar sections movably and separably connected, a part of the sections being fixed in spaced relation by a continuous connecting member and the remaining sections having shorter connecting members fixed thereto and movable into the continuous member the members and sections having overlapping joints, and locking means in part carried by the continuous member and in part held by the shorter members and enclosed within the members and operable to lock the members and sections in permanent closed positions.

In testimony whereof I affix my signature.

GEORGE H. SAUTON.